US006684340B1

(12) United States Patent
Lubcke et al.

(10) Patent No.: US 6,684,340 B1
(45) Date of Patent: Jan. 27, 2004

(54) MEASURING INSTRUMENT HAVING TWO PAIRS OF LINES CONNECTED TO TWO INDENTICAL PAIRS OF TERMINALS, VIA WHICH SIGNAL CURRENT FLOWS THROUGH ONE PAIR AND SUPPLY CURRENT FLOWS THROUGH THE OTHER PAIR

(75) Inventors: Wolfgang Lubcke, Steinen (DE); Peter Gerst, Weil am Rhein (DE); Jean-Gyl Capt, Habsheim (FR)

(73) Assignee: Endress + Hauser GmbH + Co., Maulburg (DE)

( * ) Notice: Subject to any disclaimer, the term of this patent is extended or adjusted under 35 U.S.C. 154(b) by 669 days.

(21) Appl. No.: 09/677,725

(22) Filed: Oct. 2, 2000

Related U.S. Application Data

(60) Provisional application No. 60/197,545, filed on Apr. 17, 2000.

(30) Foreign Application Priority Data

Oct. 7, 1999 (EP) .......................................... 99119840

(51) Int. Cl.[7] .............................................. G06F 1/28

(52) U.S. Cl. ......................................... 713/300; 702/64

(58) Field of Search ................................ 713/300, 310, 713/320, 340; 702/33, 45, 47, 57, 60, 64, 65, 127, 130; 365/79

(56) References Cited

U.S. PATENT DOCUMENTS

| | | | | |
|---|---|---|---|---|
| 3,887,864 A | * | 6/1975 | Knudsen | 323/270 |
| 5,416,723 A | | 5/1995 | Zyl | |
| 5,721,688 A | * | 2/1998 | Bramwell | 702/63 |
| 5,742,225 A | * | 4/1998 | Wetzel et al. | 340/310.02 |
| 6,239,604 B1 | * | 5/2001 | Van Lammeren et al. | 324/765 |
| 6,426,856 B1 | * | 7/2002 | Schneerson et al. | 361/79 |

FOREIGN PATENT DOCUMENTS

| | | | | |
|---|---|---|---|---|
| DE | 3934007 | | 10/1990 | |
| DE | 4426765 | | 1/1996 | |
| JP | 08321531 A | * | 12/1996 | H01L/21/66 |

* cited by examiner

*Primary Examiner*—Thomas Lee
*Assistant Examiner*—Thuan Du
(74) *Attorney, Agent, or Firm*—Jones, Tullar & Cooper, P.C.

(57) ABSTRACT

A description is given of a measuring instrument to be connected to a higher-order unit (57, 75) having at least a first and an identical second pair of terminals, which can be connected electrically, very simply and without errors, to the higher-order unit, the measuring instrument (61) comprising:

a first pair of lines (1), to be connected to the first pair of terminals, via which a signal current flows during operation, the signal current being a measure of an instantaneous measured value, and a second pair of lines (3), to be connected to the second pair of terminals, via which a supply current flows during operation, whose value is greater than or equal to a minimum signal current and less than or equal to a maximum signal current.

12 Claims, 4 Drawing Sheets

MEASURING INSTRUMENT HAVING TWO PAIRS OF LINES CONNECTED TO TWO INDENTICAL PAIRS OF TERMINALS, VIA WHICH SIGNAL CURRENT FLOWS THROUGH ONE PAIR AND SUPPLY CURRENT FLOWS THROUGH THE OTHER PAIR

This application claims the benefit of provisional application 60/197,545 filed Apr. 17, 2000.

FIELD OF THE INVENTION

The invention relates to a measuring instrument and a measuring arrangement having at least one measuring instrument.

BACKGROUND OF THE INVENTION

In the applications which are common in measurement and control engineering, for example in the monitoring, control and/or automation of complex processes, it is usual for a number of measuring instruments, for example pressure, temperature, flow and/or level measuring instruments, to be in use at the same time.

A measuring instrument generally comprises a sensor, which registers a physical measured variable and converts it into an electrical variable, and electronics which convert the electrical variable into a measurement signal. The measuring instruments have to be connected individually, that is to say they have to be supplied with power and the measurement signal has to be fed to a higher-order unit. The core of the higher-order unit is usually a control and/or regulating unit, which registers the measurement signals, evaluates them and supplies display, control and/or regulating signals for the monitoring, control and/or automation of a process as a function of the instantaneous measured values. Examples of this are programmable logic controllers (PLC), distributed control systems (DCS) or personal computers (PC).

In order to keep the work which is entailed during the installation of the measuring instrument to a low level, in measurement and control engineering use is preferably made of measuring instruments having only one pair of lines, via which both the supply to the measuring instrument and its signal transmission take place. These instruments are often referred to as two-measuring instruments are fed with 12 V, and the measuring instrument controls a current flowing via the pair of lines as a function of an instantaneous measured value. The measurement signal is a signal current in the case of these measuring instruments. According to a standard which is common in measurement and control engineering, the signal current is set to values between a minimum signal current of 4 mA and a maximum signal current of 20 mA, depending on the instantaneous measured value.

Since both the supply and the signal transmission take place via the pair of lines, given a feed voltage of 12 V and a signal current of 4 mA, there is only a power of 48 mW available to the measuring instrument. This is completely adequate for a very large number of measuring instruments. In large plants, therefore, terminal blocks are usually provided which have a large number of identical pairs of terminals for these pairs of lines to be connected to the higher-order unit. As a result of this standardization of the method of connection, a large number measuring instruments can be connected up very simply and quickly and therefore cost-effectively. Since all the pairs of lines and all the pairs of terminals are identical, wiring errors are virtually ruled out.

However, there are also measuring instruments, such as highly accurate level measuring instruments operating with microwaves, level measuring instruments operating with ultrasound or flowmeters, for which this low power is not adequate. In order that these measuring instruments can nevertheless be used in conjunction with the previously described standard, these measuring instruments usually have two pairs of lines. The measuring instrument is supplied via one of the pairs of lines, and a signal current corresponding to the previously described standard flows via the other pair of lines. For the supply, it is usually necessary to connect a transformer and a rectifier to the normal power line, which carries 230 V alternating voltage, for example, in order for example to provide a supply voltage of usually 24 V DC for the measuring instrument. This is very complicated, and there is the risk that the two pairs of lines can be transposed during the connection of the instrument.

It is an object of the invention to specify a measuring instrument which can be electrically connected, very simply and without errors, to a higher-order unit.

To this end, the invention consists in a measuring instrument to be connected to a higher-order unit having at least a first and an identical second pair of terminals, which comprises:

a first first [sic] pair of lines, to be connected to the first pair of terminals,
  via which a signal current flows during operation,
    the signal current being a measure of an instantaneous measured value, and a second second [sic] pair of lines, to be connected to the second pair of terminals,
  via which a supply current flows during operation,
    whose value is greater than or equal to a minimum signal current and less than or equal to a maximum signal current.

According to one embodiment of the invention, the supply current and at least a proportion of the signal current are available to supply the measuring instrument.

According to a further embodiment, the minimum signal current is 4 mA and the maximum signal current is 20 mA.

According to a further embodiment, a current/voltage limiter is connected to the input side of each pair of lines.

According to a further embodiment, the first pair of lines is connected to a first circuit and the second pair of lines is connected to a second circuit, and the first and the second circuits are galvanically isolated from each other.

In addition, the invention consists in a measuring arrangement having at least one measuring instrument according to the invention, in which the higher-order unit comprises a control and/or regulating unit, in particular a programmable logic controller (PLC), a distributed control system (DCS) or a personal computer (PC).

According to one embodiment of the measuring arrangement, the higher-order unit has one or more batteries of transmitter feed units, at least one battery having at least two transmitter feed units and each transmitter feed unit having a pair of terminals.

According to a further embodiment, each battery of transmitter feed units is connected to the control and/or regulating unit via a bus access circuit and a bus line in order to transmit the measured values from the measuring instruments connected thereto.

DESCRIPTION OF THE DRAWINGS

The invention and further advantages will now be explained in more detail using the figures of the drawing, in which two exemplary embodiments of a measuring instrument and three exemplary embodiments of a measuring arrangement are illustrated; identical elements are provided in the figures with the same reference symbols.

DESCRIPTION OF THE PREFERRED EMBODIMENTS

Figure 1:
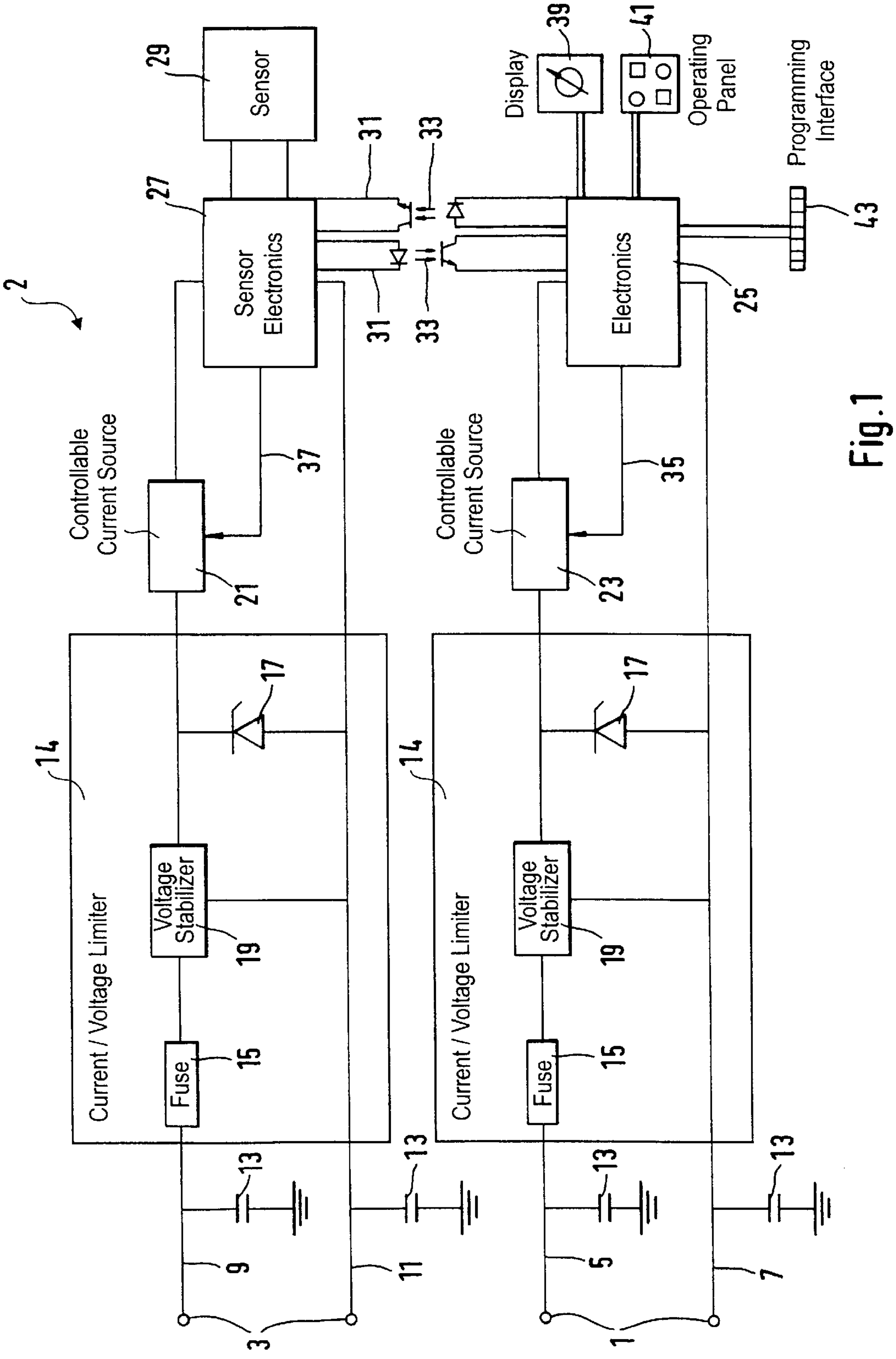
FIG. 1 shows a block diagram of a measuring instrument according to the invention having two pairs of lines, which supply two separate circuits.

FIG. 1 illustrates a block diagram of a measuring instrument that [sic] can be connected to a higher-order unit having at least a first and an identical second pair of terminals.

To this end, the measuring instrument has a first pair of lines 1 to be connected to the first pair of terminals and a second pair of lines 3 to be connected to the second pair of terminals.

The first and the second pair of lines 1, 3 each have a first and a second line 5, 7, 9, 11, each of which is earthed via a capacitor 13. The capacitors 13 are used to filter out interference signals. A current/voltage limiter is connected to the input side of each pair of lines 1, 3. Such a current/voltage limiter protects the measuring instrument against excessively high currents and/or voltages. If the current and voltage are limited to values at which the formation of sparks in the measuring instrument can be ruled out with certainty, the use of the measuring instrument in hazardous areas is possible.

In the exemplary embodiment illustrated in FIG. 1, the current is limited by means of a fuse 15 inserted in each case into the first line 5, 9 of a pair of lines 1, 3. The voltage is limited by a Zener diode 17 connected between the respective first and second line 5, 9, 7, 11 of the first and of the second pair of lines 1, 3.

In addition to the Zener diodes 17, a voltage stabilizing means 19 can be provided in each case. This is inserted into the respective first line 5, 9, for example as shown in FIG. 1, and, in order to register the voltage currently present, is connected to the respective second line 7, 11.

Following the above-described current/voltage limiter on the input side, the first line 5, 9 of each pair of lines 1, 3 in each case has a controllable current source 21, 23, which sets a current flowing via the respective pair of lines 1, 3 to a specific value as a function of a control signal.

Connected to the first pair of lines 1 are electronics 25. The second pair of lines 3 supplies sensor electronics 27 and a sensor 29 connected thereto. The sensor 29 registers a physical measured variable, for example a pressure, a level in a container or a flow rate through a pipe, and converts this into an electrical variable, for example a voltage, a current, a resistance change, a capacitance change or a signal. The electrical variable is registered by means of the sensor electronics 27 and made accessible for further evaluation and/or processing.

In the exemplary embodiment of FIG. 1, the sensor electronics 27 are connected to the electronics 25 by signal lines 31, via which the information can be exchanged. In the exemplary embodiment shown, this connection is bidirectional and preferably has galvanic isolation 33. In the exemplary embodiment of FIG. 1, galvanic isolation 33 is implemented by means of two optocouplers.

The final measured value is determined, for example, by the sensor electronics 27 and transmitted to the electronics 25. Equally well, however, a raw signal can also be transmitted from the sensor electronics 27 to the electronics 25, which then determine the measured value from the raw signal.

During operation, the electronics 25 generate a control signal, which depends on the instantaneous measured value and is applied to the current source 23 via a signal line 35. The control signal has the effect that, during operation, the current source 23 causes a signal current to flow via the first pair of lines 1 which is a measure of an instantaneous measured value.

According to a standard which is common in measurement and control engineering, the signal current varies as a function of the measured value between a minimum signal current of 4 mA and a maximum signal current of 20 mA. The necessary power is provided by the higher-order unit. A signal current of more than 20 mA or less than 4 mA is normally recognized by the higher-order unit as a malfunction and effects the triggering of an alarm and/or the initiation of process-specific handling directed toward safety.

During operation, the sensor electronics 27 likewise generate a control signal which is applied to the current source 21 via a signal line 37. This control signal is independent of the instantaneous measured value. During operation, the control signal has the effect that the current source 21 causes a supply current to flow via the second pair of lines 3.

According to the invention, the control signal is designed in such a way that the supply current in normal operation always has a value which is greater than or equal to the minimum signal current and less than or equal to the maximum signal current. The standard of 4 mA to 20 mA which is common in measurement and control engineering is likewise used here. In the case of a measuring instrument which always needs a great deal of power, the supply current will preferably always be equal to the maximum signal current. In the case of a measuring instrument which needs a high power on the basis of the measurement operation, for example only at specific time intervals, but otherwise manages with considerably less power, it is advisable to vary the supply current via the control signal in accordance with the current power demand.

The measuring instrument may have, as required, an on-site display 39, an operating panel 41 and/or a programming interface 43. The on-site display 39 is used for example to display the current measured value or else, in conjunction with the operating panel 41, to display the data entered via the operating panel 41. Via the operating panel 41 it is possible, for example, for a configuration, a calibration and/or a setting of a measuring range of the measuring instrument to be carried out at the point of use. A handheld terminal, for example, can be connected via the programming interface 43.

Display 39, operating panel 41 and/or programming interface 43 can be connected to the electronics 25, as illustrated in FIG. 1, and are supplied by the electronics 25 via the first pair of lines 21.

Both the sensor electronics 27 and the electronics 25 can contain voltage regulators, which transform [sic] a voltage applied by the higher-order unit to the first and to the second pair of lines 1, 3 to values which are matched to the requirements of the electronics 25, the sensor electronics 27, the sensor 29, the display 39, the operating panel 41 and the programming interface 43.

During the design of the measuring instrument, the procedure is preferably such that the functional blocks of the measuring instrument are divided up into analog and digital functional blocks. The analog functional blocks are preferably integrated into the sensor electronics 27, and the digital functional blocks are preferably integrated into the electronics 25. This offers the advantage that it is possible to manage with very few voltage regulators. As a rule, the digital functional blocks have a considerably lower power requirement than the analog functional blocks and the sensor 29. Consequently, during the above-described division, the functional blocks with the lower power requirement are supplied with the signal current via the first pair of lines 1. The functional blocks with the higher power requirement are supplied with the supply current via the second pair of lines 3. Thus, the supply current and at least a proportion of the signal current are available to supply the measuring instrument.

The first pair of lines 1 is connected to a first circuit, which contains the electronics 25. The second pair of lines 3 is connected to a second circuit, which contains the sensor electronics 27 and the sensor 29. The two circuits are isolated from each other and connected only via the signal lines 31. Since the signal lines 31 have galvanic isolation 33, the two circuits are also galvanically isolated from each other.

From the view of the higher-order unit, the two pairs of lines 1, 3 are identical with regard to their power supply. For the higher-order unit, the measuring instrument behaves electrically in exactly the same way as if two 2-wire measuring instruments were connected. Both 2-wire measuring instruments meet the above mentioned standard, common in measurement and control engineering, in which the signal current assumes values from 4 mA to 20 mA.

Figure 2:
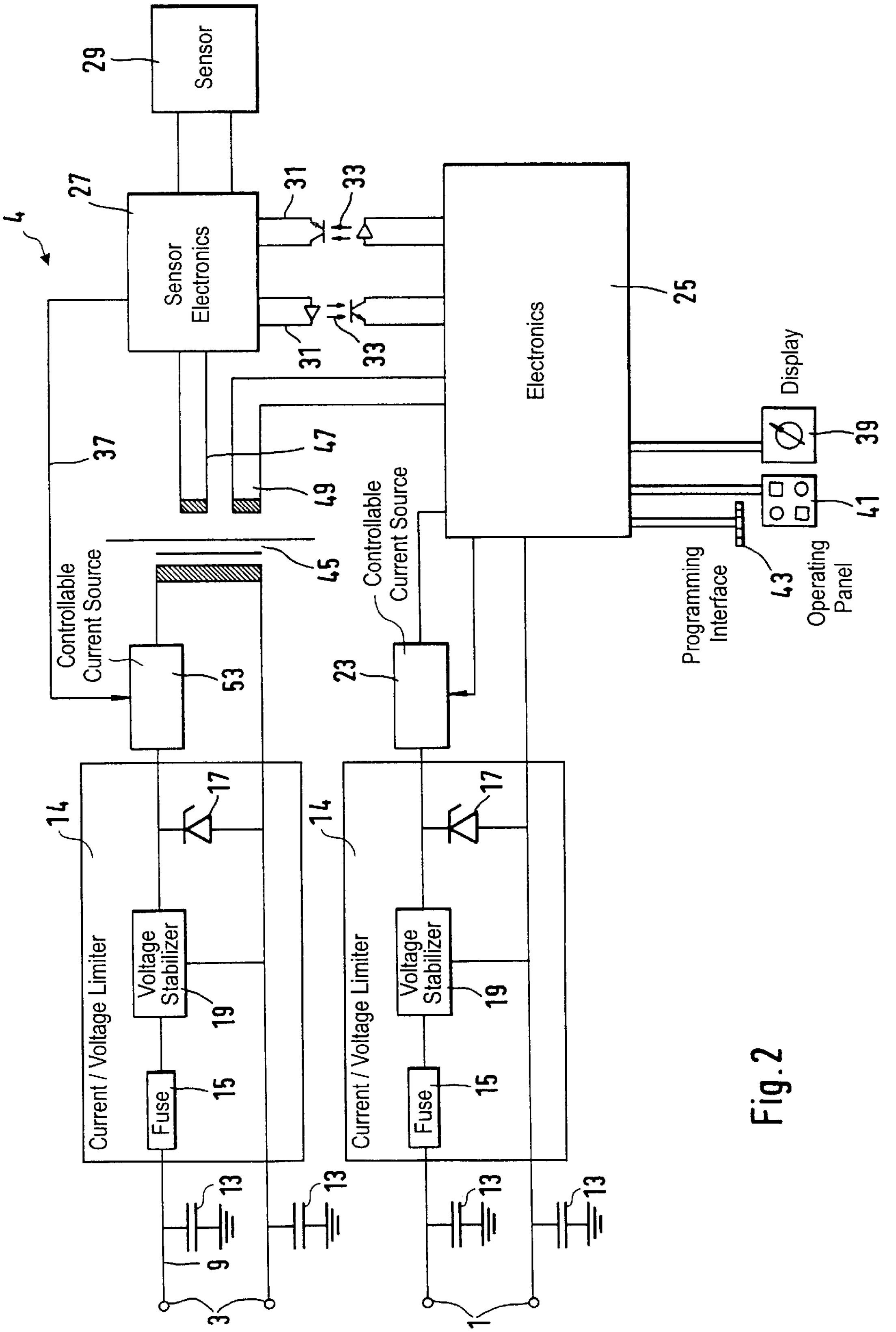
FIG. 2 shows a block diagram of a measuring instrument in which power supplied via the second pair of lines is distributed to a number of end users via a transformer having a number of outputs.

FIG. 2 shows a further exemplary embodiment of a measuring instrument according to the invention. Because of the relatively far-reaching agreement, only the differences from the exemplary embodiment illustrated in FIG. 1 will be described specifically below.

The significantly [sic] difference resides in the division of the power taken up by the measuring instrument.

In the second circuit, a transformer 45 is provided, which on the primary side is fed via the second pair of lines 3 and on the secondary side has two outputs 47, 49. The sensor electronics 27 and the sensor 29 are supplied via the first output 47. The second output 49 is connected to the electronics 25. The electronics 25 are therefore on the one hand supplied via the signal current flowing in the first pair of lines 1, exactly as in the exemplary embodiment illustrated in FIG. 1, but in addition they also draw power via the second output 49 of the transformer 45, said power being fed to the measuring instrument via the second pair of lines 3.

In the exemplary embodiment shown in FIG. 2, it is also the case that the sensor electronics 27 supply a control signal which is used to set the supply current flowing in the primary circuit via the second pair of lines 3. The control signal is applied via the signal line 37 to a regulating unit 53 which is arranged in the primary circuit and which sets the supply current appropriately.

According to the invention, the control signal is also designed here in such a way that, in normal operation, the supply current always has a value which is greater than or equal to the minimum signal current and less than or equal to the maximum signal current.

By means of the transformer 45, galvanic isolation between the two circuits is ensured in this exemplary embodiment as well.

In a completely analogous way, it is of course also possible for part of the power available via the signal current to be fed, galvanically isolated, to the sensor electronics 27 and/or the sensor 29, by a transformer being placed in the first circuit and being connected via one output to the electronics 25 and via a further output to the sensor electronics 27 and/or the sensor 29.

From the view of the higher-order unit, the two pairs of lines 1, 3 are identical with regard to their power supply in this exemplary embodiment as well. For the higher-order unit, the measuring instrument behaves electrically in exactly the same way as if two 2-wire measuring instruments were connected. Both 2-wire measuring instruments meet the above mentioned standard, common in measuring and control engineering, in which the signal current assumes values from 4 mA to 20 mA.

A particular advantage is that the measuring instruments according to the invention do not have to be supplied by mains voltage. As a result, in measuring instruments according to the invention, only the low signal and supply currents occur. This increases safety, in particular in plants or points of use where, for example, there is a considerable risk of explosion.

Figure 3:
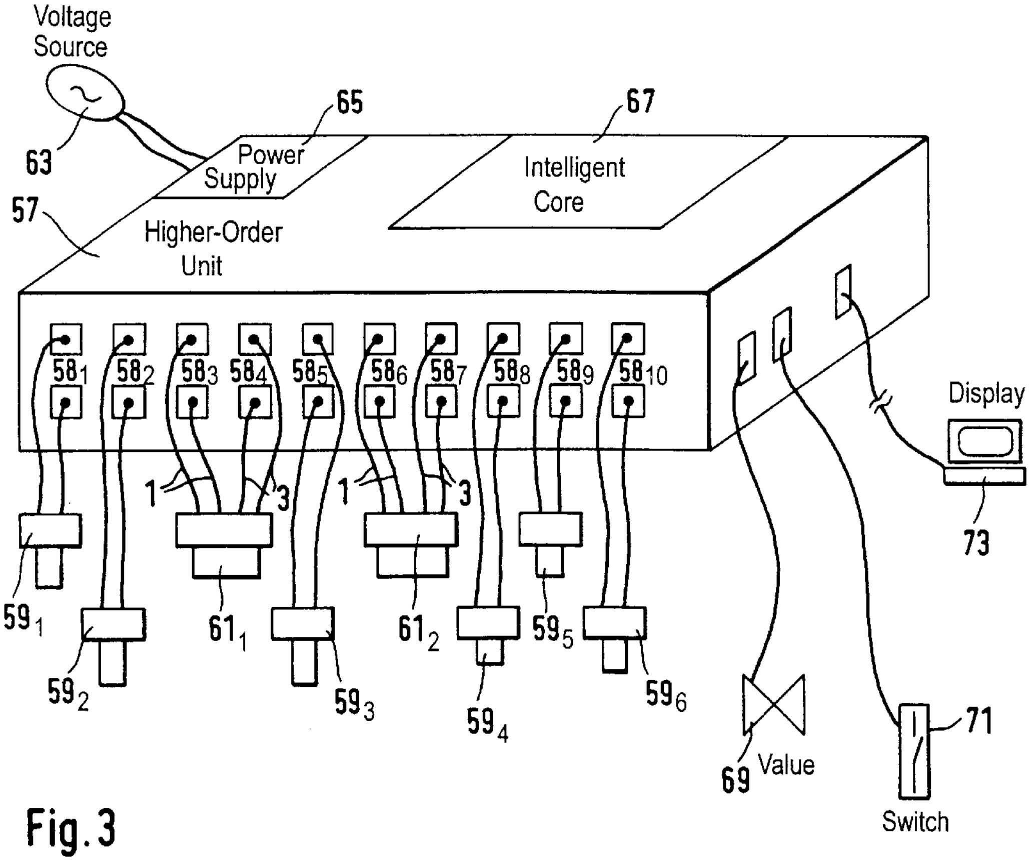
FIG. 3 shows a measuring arrangement having at least one measuring instrument according to the invention.
Figure 4:
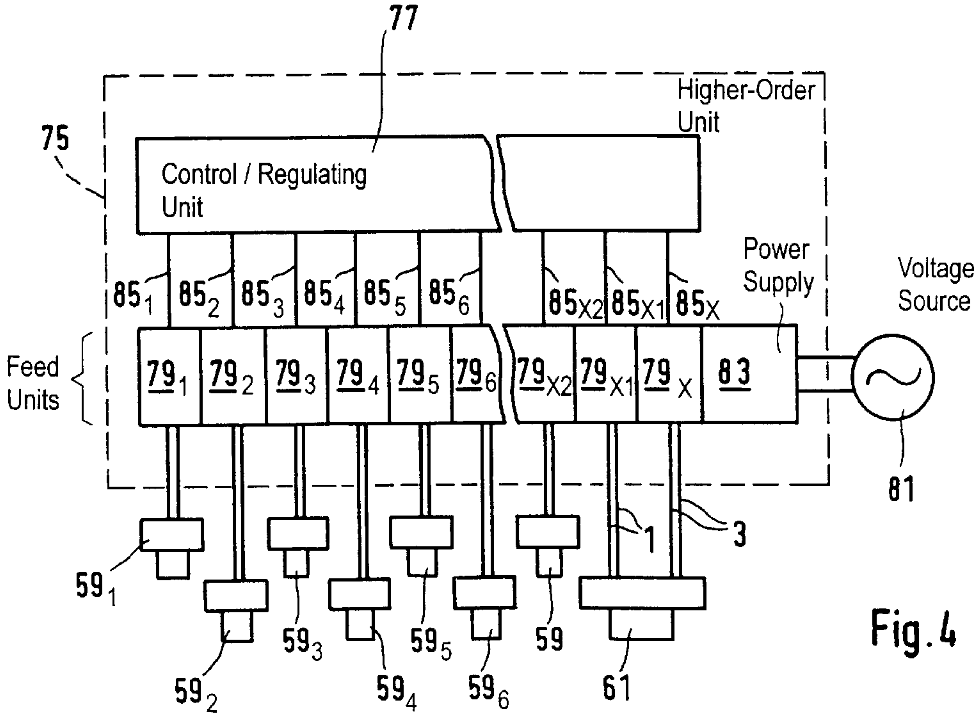
FIG. 4 shows a measuring arrangement in which the higher-order unit has a control and/or regulating unit and a battery of transmitter feed devices arranged remotely therefrom.
Figure 5:
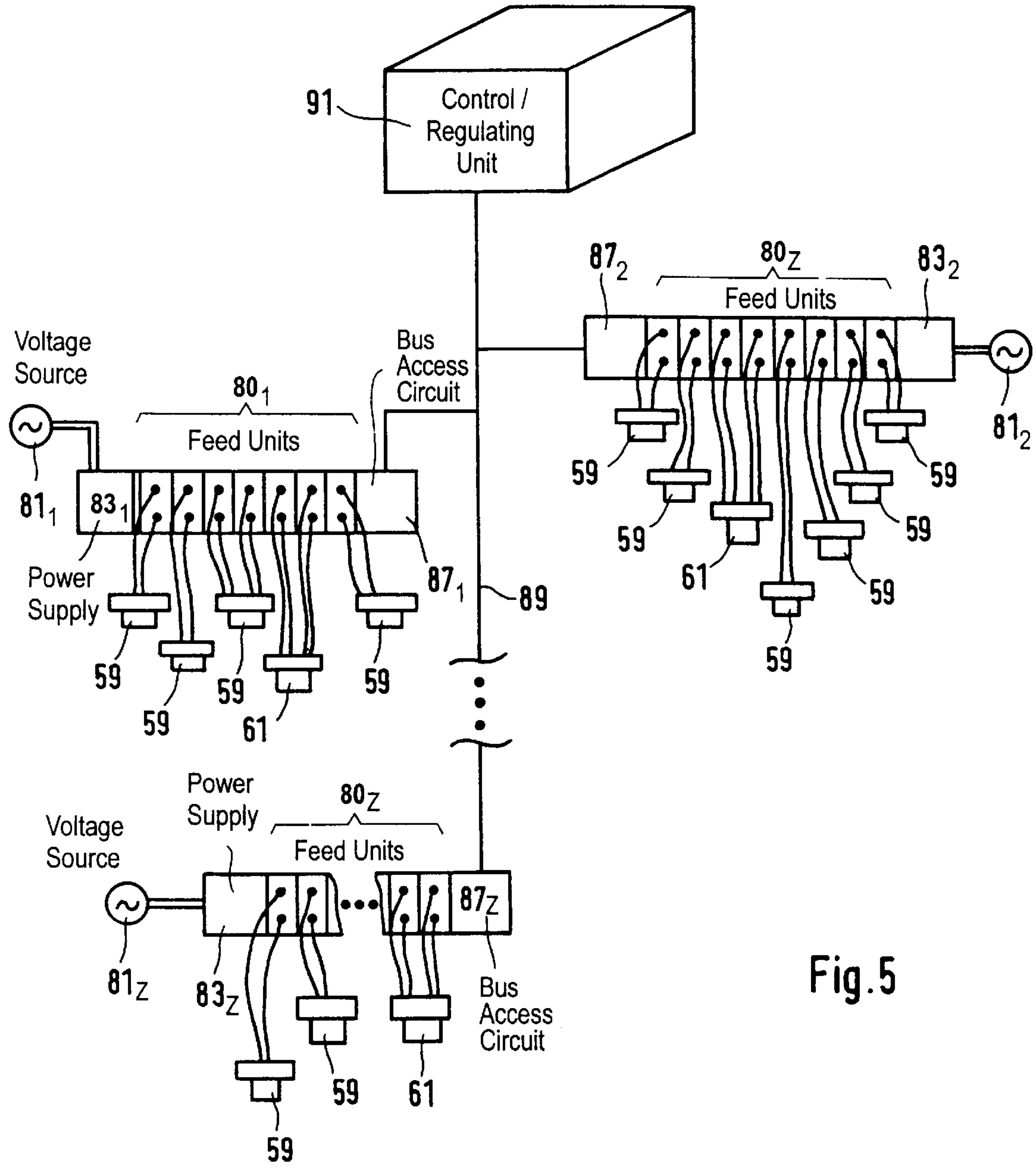
FIG. 5 shows a measuring arrangement which has a number of batteries of transmitter feed units which are each connected to a control and/or regulating unit via a bus access circuit and a bus line.

FIGS. 3 to 5 show three different measuring arrangement [sic] having measuring instruments according to the invention.

FIG. 3 illustrates a measuring arrangement having a higher-order unit 57, to which six conventional 2-wire measuring instruments 59 and two measuring instruments 61 according to the invention are connected.

The higher-order unit 57 is, for example, a programmable logic controller or a distributed control system. In the exemplary embodiment shown, for reasons of clarity it has only 10 identical pairs of terminals, numbered consecutively from 1. to 10. Each pair of terminals is designed as standard for the connection, the supply and the transmission of a measured value in the form of a signal current of a 2-wire measuring instrument.

The higher-order unit 57 has a power supply unit 65 which is connected to a voltage source 63 and via which the individual pairs of terminals 1. to 10. are supplied. Each pair of terminals 1. to 10. is assigned a pick-up unit, which registers a current flowing via a pair of terminals 1. to 10. and generates a signal corresponding to the current and feeds it to an intelligent core 67 of the higher-order unit 57, for example a microprocessor. In the intelligent core 67, all the incoming measured values are monitored and, in accordance with a flow chart stored in the intelligent core 67, display, control, regulating or switching operations are triggered as a function of the instantaneous measured values. This is illustrated symbolically in FIG. 3 by a first output, via which the higher-order unit 57 controls a valve 69, a second output, via which the higher-order unit 57 controls a switch 71, and a third output, via which the higher-order unit 57 controls a display 73. The display used can of course also be a personal computer, which not only displays a measured value but, for example, can also visualize a process sequence of an entire plant.

In the exemplary embodiments illustrated, conventional 2-wire measuring instruments 59 are connected to the 1$^{st}$, the 2$^{nd}$, the 5$^{th}$, the 8$^{th}$, the 9$^{th}$ and the 10$^{th}$ pair of terminals. The current flowing in each case via one of these pairs of terminals 1., 2., 5., 8., 9., 10. corresponds to a measured value from the respective conventional 2-wire measuring instrument 59.

A measuring instrument 61 according to the invention is connected to the two pairs of terminals 3. and 4., by the first pair of lines 1 being connected to the 3$^{rd}$ pair of terminals and the second pair of lines 3 being connected to the 4$^{th}$ pair of terminals. A further measuring instrument 61 according to the invention is connected to the pairs of terminals 6. and 7., by its first pair of lines 1 being connected to the 6$^{th}$ pair of terminals and its second pair of lines 3 being connected to the 7$^{th}$ pair of terminals.

With regard to the electrical connection, the measuring instrument [sic] 61 according to the invention in no way differ from the conventional 2-wire measuring instruments 59. In each case, one pair of lines is connected to a pair of terminals in the case of all the instruments. In the flow chart in the intelligent core 67 of the higher-order unit 57, it is defined which pair of terminals 1. to 10. is assigned what significance. For example, the fact is stored there that the measured value obtained via the first pair of terminals 1. is a level in a specific container. In the flow chart, it is also possible, for example, to define that when a specific level is reached, an outlet valve which responds to an output from the higher-order unit 57 and belongs to this container is to be opened.

One difference between the conventional 2-wire measuring instruments 59 and the measuring instruments 61 according to the invention resides in the fact that the current flowing via the respective first pairs of lines 1 is a signal current, which represents a measured value which is registered and used by the higher-order unit 57. The supply current flowing via the respective second pair of lines 3 is either ignored completely by the higher-order unit 57, for example by its not appearing at all in the flow chart, or else it can be allocated an alarm function or the like. An alarm function could be configured, for example, in such a way that the higher-order unit 57 triggers an alarm or reports a malfunction if the supply current is greater than the maximum signal current or less than the minimum signal current. In addition, a sequence of actions directed toward safety can be provided in the flow chart for the eventuality of a malfunction of the measuring instrument.

FIG. 4 shows a further exemplary embodiment of a measuring arrangement having at least one measuring instrument 61 according to the invention. The significant difference from the measuring arrangement illustrated in FIG. 3 consists in that the higher-order unit 75 of FIG. 4 comprises a control and/or regulating unit 77, for example a programmable logic controller (PLC) or a distributed control system (DCS), and a battery, arranged physically separately from the latter, of series-connected transmitter feed units 79. The battery is supplied via a power supply unit 83 connected to a voltage source 81. Each transmitter feed unit 79 has a pair of terminals for a 2-wire measuring instrument. In order that a measuring instrument according to the invention can be connected, the battery must have at least two transmitter feed units 79. However, it is usual for such batteries to have considerably more than two, for example 10 or 64, transmitter feed units.

Each transmitter feed unit 79 can be connected via its pair of terminals to a measuring instrument, it feeds the measuring instrument, registers a current flowing via the pair of lines connected to its pair of terminals and, via a signal line 85, outputs a signal to the control and/or regulating unit 77 corresponding to the current. In this exemplary embodiment, too, a number of identical pairs of terminals is therefore provided and, for the connection of conventional 2-wire measuring instruments 59 and measuring instruments 61 according to the invention, that which was said previously in conjunction with the exemplary embodiment illustrated in FIG. 3 applies.

FIG. 5 shows a further exemplary embodiment of a measuring arrangement. The measuring arrangement has a number of batteries of transmitter feed units 79, which are in each case fed via a power supply unit 83 connected to a voltage source 81. Exactly as in the case of the exemplary embodiment illustrated in FIG. 4, each transmitter feed unit 79 here also has a pair of terminals, and both conventional 2-wire measuring instruments 59 and measuring instruments 61 according to the invention are connected to the transmitter feed units 79.

In order to transmit the measured values, from the measuring instruments 59, 61 connected to it, each battery of transmitter feed units is connected via a bus access circuit 87 and a bus line 89 to a control and/or regulating unit 91, for example a programmable logic controller (PLC), a distributed control system (DCS) or a personal computer (PC).

All three measuring arrangements produce the advantages of the measuring instruments 61 according to the invention to a considerable extent. Thus, although these instruments need more power than the 2-wire measuring instruments 59, in which, as previously described, the supply and the transmission of the measured value is certainly carried out via one and the same pair of lines, and therefore only a limited power is available, they can readily be used in a measuring arrangement which is intrinsically designed only for 2-wire measuring instruments. Additional supply terminals, such as conventional measuring instruments with a higher power demand have, are no longer necessary, because of the design according to the invention of the measuring instruments 61. The measuring instruments 61 according to the invention are connected to the higher-order unit together with the 2-wire measuring instruments and in an identical way. An additional operation is not required, and errors on account of transpositions of the terminals of these instruments are ruled out.

What is claimed is:

1. Measuring instrument to be connected to a higher-order unit having at least a first and an identical second pair of terminals, comprising:

a first first pair of lines, to be connected to the first pair of terminals, via which a signal current flows during operation, the signal current being a measure of an instantaneous measured value, and a second second pair of lines, to be connected to the second pair of terminals, via which a supply current flows during operation, whose value is greater than or equal to a minimum signal current and less than or equal to a maximum signal current.

2. Measuring instrument according to claim 1, for which the supply current and at least a proportion of the signal current are available to supply the measuring instrument.

3. Measuring arrangement having at least one measuring instrument according to claim 2, in which the higher-order unit comprises a control and/or regulating unit, in particular a programmable logic controller, a distributed control system or a personal computer.

4. Measuring instrument according to claim 1, for which the minimum signal current is 4 mA and the maximum signal current is 20 mA.

5. Measuring arrangement having at least one measuring instrument according to claim 4, in which the higher-order unit comprises a control and/or regulating unit, in particular a programmable logic controller, a distributed control system or a personal computer.

6. Measuring instrument according to claim 1, comprising a current/voltage limiter connected to the input side of each pair of lines.

7. Measuring arrangement having at least one measuring instrument according to claim 6, in which the higher-order unit comprises a control and/or regulating unit, in particular a programmable logic controller, a distributed control system or a personal computer.

8. Measuring instrument according to claim 1, having the first pair of lines connected to a first circuit and the second pair of lines connected to a second circuit, and the first and the second circuits are galvanically isolated from each other.

9. Measuring arrangement having at least one measuring instrument according to claim 8, in which the higher-order unit comprises a control and/or regulating unit, in particular a programmable logic controller, a distributed control system or a personal computer.

10. Measuring arrangement having at least one measuring instrument according to claim 1, in which the higher-order unit comprises a control and/or regulating unit, in particular a programmable logic controller a distributed control system or a personal computer.

11. Measuring arrangement according to claim 10, wherein the higher-order unit has one or more batteries of transmitter feed units, at least one battery having at least two transmitter feed units and each transmitter feed unit having a pair of terminals.

12. Measuring arrangement according to claim 11, wherein each battery of transmitter feed units is connected to the control and/or regulating unit via a bus access circuit and a bus line in order to transmit the measured values from the measuring instruments connected thereto.

* * * * *